United States Patent [19]

Ueda et al.

[11] 4,087,829
[45] May 2, 1978

[54] EXPOSURE INDICATING DEVICES FOR USE IN MULTI-EXPOSURE CONTROLLED CAMERAS

[75] Inventors: Hiroshi Ueda, Nara; Shigeru Oyokota, Sakai, both of Japan

[73] Assignee: Minolta Camera Kabushiki Kaisha, Osaka, Japan

[21] Appl. No.: 661,299

[22] Filed: Feb. 25, 1976

[30] Foreign Application Priority Data

Feb. 26, 1975 Japan .................................. 50-22743
Mar. 1, 1975 Japan ............................. 50-27203[U]
Dec. 22, 1975 Japan ................................ 50-151829

[51] Int. Cl.² .......................... G03B 7/08; G03B 17/20
[52] U.S. Cl. ........................................ 354/38; 354/53; 354/60 E; 354/60 L
[58] Field of Search .................... 354/24, 26, 29, 30, 354/38, 43, 47, 50, 51, 52, 53, 54, 55, 56, 57, 60 E, 60 L, 61

[56] References Cited

U.S. PATENT DOCUMENTS

| | | | |
|---|---|---|---|
| 3,077,151 | 2/1963 | Weller | 354/53 X |
| 3,486,428 | 12/1969 | Fukushima | 354/50 |
| 3,502,011 | 3/1970 | Rentschler et al. | 354/60 X |
| 3,563,141 | 2/1971 | Starp | 354/30 X |
| 3,712,194 | 1/1973 | Yoshimura | 354/51 X |
| 3,896,472 | 7/1975 | Yoshiyama et al. | 354/38 X |
| 3,949,412 | 4/1976 | Taguchi et al. | 354/51 X |
| 3,950,765 | 4/1976 | Nanba et al. | 354/51 X |
| 3,972,055 | 7/1976 | Matsuda et al. | 354/30 X |
| 3,987,460 | 10/1976 | Uedu et al. | 354/43 |

FOREIGN PATENT DOCUMENTS

| | | | |
|---|---|---|---|
| 156,027 | 4/1939 | Germany | 354/53 |
| 1,173,793 | 7/1964 | Germany | 354/53 |

Primary Examiner—L. T. Hix
Assistant Examiner—William B. Perkey
Attorney, Agent, or Firm—Watson, Cole, Grindle & Watson

[57] ABSTRACT

Exposure indicating devices for use in multi-exposure controlled cameras are disclosed. In the multi-exposure controlled camera, the diaphragm and/or the shutter speed are preferentially preset, that element or factor for governing exposure which has not been preset is automatically controlled. According to the present invention, exposure indicating devices are used to notify the camera operator, prior to exposure, how the shutter speed and diaphragm aperture to be eventually effected will be commensurate with the brightness of an object, according to the controlled lighting of two illuminative indicating members.

21 Claims, 23 Drawing Figures (A)  (B)

EXPOSURE INDICATING DEVICES FOR USE IN MULTI-EXPOSURE CONTROLLED CAMERAS

BACKGROUND OF THE INVENTION

This invention relates to multi-exposure controlled cameras wherein the diaphragm and/or shutter speed is selectively automatically controlled, and more particularly to exposure indicating devices for use in such cameras for indicating the particular exposure control condition to be carried out.

Multi-exposure cameras are operated such that the diaphragm is preferentially set by manual operation and the shutter speed is automatically controlled, or such that the shutter speed is preferentially set by manual operation and the diaphragm is automatically controlled. Also such cameras may be operated with the diaphragm and shutter speed maintained in a programmed relationship.

Problems are encountered in known multi-exposure cameras in the exposure control mode where the shutter speed is preferentially set and the diaphragm is automatically controlled. For example, if the shutter speed is preferentially set, there may result the following three different exposure conditions: (a) the diaphragm aperture can be determined with its possible range without changing shutter speed from its set value for providing an optimum exposure for the brightness of the object; (b) where, even if the diaphragm is stopped-down to its minimum aperture, there is over-exposure at the selected shutter speed because of excessively high brightness of the object; and (c) where, even if the diaphragm is brought to its fully open position, there is under-exposure at the selected shutter speed because of excessively low brightness of the object. It is undesirable to take photographs in either over-exposure or under-exposure conditions, represented by conditions (b) and (c) above, respectively.

With a multi-exposure controlled camera operated under the conditions (a), the diaphragm is controlled according to voltage signals commensurate with the preset shutter speed, brightness of the object and the film sensitivity, after which the shutter speed is controlled according to the intensity of light from the object which has passed through the prior controlled diaphragm. In this case, the controlled shutter speed substantially coincides with the preset shutter speed.

With the exposure conditions (b) and (c), an optimum diaphragm aperture cannot be obtained according to the voltage signals that are commensurate with a preset shutter speed. For the exposure conditions (b), the diaphragm is stopped down to a minimum diaphragm aperture, and then the shutter speed is controlled according to the intensity of light from an object passing through the minimum diaphragm aperture. In this case, the shutter speed to be eventually controlled will be faster than the preset shutter speed. However, for the exposure conditions (c), the diaphragm is held at its fully open position, and then the shutter speed is controlled according to the intensity of light from an object passing through the fully open diaphragm. As a result, the shutter speed to be eventually controlled will be slower than the preset shutter speed. As is clear from the foregoing, in the exposure control mode where the shutter speed is initially preset, the shutter speed for proper exposure may be equal to, faster, or slower than the preset shutter speed, as the case may be. Accordingly, because the eventual shutter speed control, in accordance with the particular exposure conditions, may deviate from the preset shutter speed, it is desirable to notify the camera operator, prior to photographing, of the exposure condition in which the picture is to be taken i.e., how the eventual shutter speed and diaphragm will be.

Additionally, in cameras of the type in which the diaphragm automatic control means is either made inoperable, or no diaphragm automatic control means are provided, and there is only means for manually pre-setting the diaphragm aperture, or in which the diaphragm is preferentially set manually and the shutter speed is automatically controlled, it would be advantageous for the camera operator to know, prior to exposure, whether the preselected shutter speed is equal to, faster, or slower than the eventual shutter speed to be controlled. Further, when the camera operator selects a shutter speed which falls within a range ensuring that the picture will not be blurred with the camera held by hands, it would be advantageous for him to know, prior to exposure, whether his photographing at such an eventual optimum shutter speed will cause a blurred photograph.

OBJECTS OF THE INVENTION

It is an object of the present invention to provide an improved exposure control device for use in a camera of the type, in which the diaphragm is preferentially manually set and the shutter speed is automatically controlled, by the use of comparative indicating means in addition to means for indicating the selected shutter speed, whereby the comparative indicating means notifies the camera operator, prior to exposure, of whether the resulting shutter speed to be controlled upon exposure is faster or slower than the selected shutter speed.

It is another object of the present invention to provide an exposure indicating device for use in cameras of the type, wherein both the shutter speed and the diaphragm are automatically controllable, where the indicating device indicates the preset shutter speed as well as notifies the camera operator that exposure condition in which the picture is to be taken by means of comparative indicating members, prior to actual exposure.

It is a further object of the present invention to provide an exposure indicating device for use in cameras of the type wherein both the shutter speed and the diaphragm are controllable, and in the exposure mode where the diaphragm is preferentially set and the shutter speed is automatically controlled, the selected shutter speed is indicated by means of a shutter-speed-graduated member and a shutter-speed-indexing member, and also an indication is provided of whether the shutter speed to be eventually used for the set diaphragm aperture is faster or slower than the selected shutter speed.

It is a still further object of the present invention to provide an exposure indicating device for use in multi-exposure controlled cameras in which when the shutter speed is preferentially set and the diaphragm is automatically controlled, an indication of the selected shutter speed is provided by the shutter-speed-graduated member and its indexing member, and also whether the diaphragm is automatically controllable within its possible range at the aforesaid selected shutter speed. Moreover, if the diaphragm is not controllable within its possible range, the diaphragm is stopped-down to its minimum diaphragm aperture, and an indication is then provided as to whether the shutter speed to be eventually controlled is faster than the selected shutter speed for obtaining an optimum exposure; and additionally, if the diaphragm is not controllable, the diaphragm is held at its fully open position, and an indication is provided as to whether the shutter speed to be eventually controlled is slower than the selected shutter speed for obtaining an optimum exposure.

It is a yet further object of the present invention to provide an exposure indicating device for use in multi-exposure controlled cameras to obtain extended service life and a desired resistance to vibration and impact, without using a meter.

SUMMARY OF THE INVENTION

According to the present invention, there is provided an exposure indicating device for use in multi-exposure controlled cameras, to obtain the aforesaid objects, wherein either a shutter-speed-graduated member or a shutter-speed indicating member is operated in cooperation with a shutter speed setting member to indicate a set shutter speed, and a comparative indicating member indicates whether the shutter speed to be eventually controlled upon actual exposure is commensurate with the brightness of an object, the film sensitivity, and whether the shutter speed is equal to, faster, or slower than the aforesaid preset shutter speed.

Thus, the camera operator may be notified beforehand of the particular exposure mode. For instance, in case the camera operator selects a shutter speed that will not cause a blur with the camera held by hands, if the exposure is to be effected at a shutter speed slower than the aforesaid preset shutter speed, which may present the possibility of a blurred photograph, a warning is given to the camera operator, notifying him that he should use a tripod or a flash attachment, so as to prevent such a possibility.

The above features and objects of the present invention are apparent from the ensuing description taken in conjunction with the following drawings.

DESCRIPTION OF THE PREFERRED EMBODIMENTS

Figure 1:
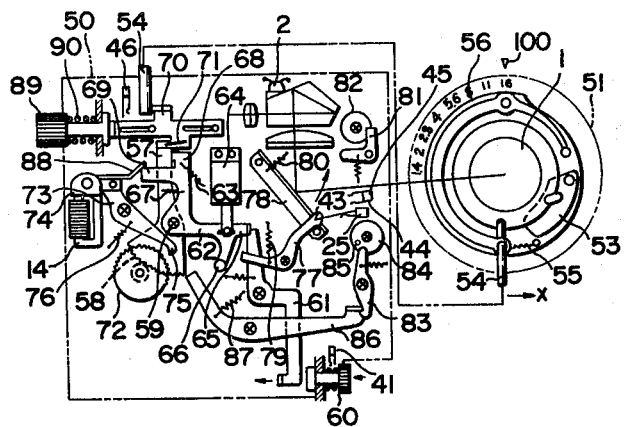
FIG. 1 is a side view of a camera body and a rear view of an objective lens, showing the essential part of the first embodiment of a camera mechanism according to the present invention.
Figure 3:
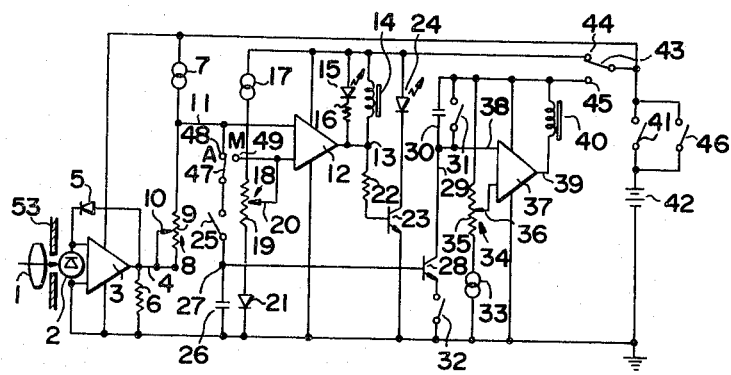
FIG. 3 is a circuit diagram of an exposure control circuit for the first embodiment.

FIG. 1 depicts an example of a portion of a camera exposure control mechanism according to the present invention, including an exchangeable lens with an objective lens and adjustable diaphragm. FIG. 3 shows a circuit diagram of an exposure control circuit for use therein. With reference to FIG. 3, photodiode 2 receives the light having an intensity, which light has passed through objective lens 1 and diaphragm aperture formed by diaphragm blades 53 (one blade is shown in FIG. 1). The terminals of photodiode 2 are connected to amplifying circuit 3, and logarithmically converting diode 5 is connected between output terminal 4 of amplifier 3 and one terminal of photodiode 2, thereby forming a negative feedback circuit.

Output resistor 6 is connected between output terminal 4 and the anode terminal of photodiode 2. Amplifying circuit 3 maintains a substantially zero voltage level across both terminals of photodiode 2. Photodiode 2 provides a photocurrent, including no dark current, which is accurately proportional to the quantity of incident light thereon i.e., proportional to $(B_V-A_V)$, wherein $B_V$ represents a luminance value and $A_V$ represents an aperture value, respectively in APEX notation. Since photoelectric-current flows into diode 5, a voltage level proportional to the logarithmic value of the quantity of incident light is generated across output resistor 6 according to the aforesaid photoelectric-current and the resistance of resistor 6. All these elements 2, 3, 5 and 6 form a light measuring circuit. A series circuit, consisting of constant current source 7 and first potentiometer 8 consisting of resistance 9 and a sliding element 10, provides a level shift circuit, whereby the voltage between terminal 11 and sliding element 10 is added to the voltage of output resistor 6, so that the sum of the voltages at terminal 11 is a shutter speed control signal voltage. Resistance 9 of first potentiometer 8 has a linear characteristic, and its sliding element 10 moves commensurate with the film sensitivity setting $(S_V)$ i.e., a set film speed value.

Differential amplifying circuit 12 is a switching circuit, and electromagnet 14 is connected to output terminal 13 thereof to terminate the stopping-down operation of diaphragm blades 53. Light-emitting diode (LED)

15, which emits green light, is connected in series to resistor 16, in parallel with electromagnet 14. Constant current source 17, resistance 19 of second potentiometer 18 and diode 21 are connected in series relationship to provide a switching level to differential amplifying circuit 12. Sliding element 20 of potentiometer 18 is moved in accordance with the setting of the shutter speed for the automatic diaphragm exposure control mode. As is known to those skilled in the art resistance 19 should have a linear characteristic. Diode 21 compensates for temperature induced variations in the voltage-current characteristic of diode 5.

Additionally, LED 15 is connected in series with resistor 22, which is connected in series to electromagnet 14, and the other terminal of resistor 22 is connected to the base of transistor 23. LED 24, which emits a red light, is connected to the collector of transistor 23.

The circuit consisting of resistors 16, 22, transistor 23, LEDs 15, 24, which emit green light and red light, respectively, provides an indication for the case where an object is too dark in the automatic diaphragm control exposure mode with the shutter speed preset, by lighting LED 24, which informs the camera operator that an optimum exposure at the preset shutter speed cannot be obtained, even if the diaphragm is held at its fully open position. Also for the case of automatic shutter speed control with the diaphragm preset mode, the aforementioned circuit serves as an indicating circuit, which lights LED 15, in the case where an object is so bright that there may not be obtained an optimum exposure at the shutter speed selected as a reference and the preset diaphragm aperture.

One contact of switch 25 is connected to terminal 11 through switch 47. Switch 25 is normally closed but is opened immediately before movable mirror 78 (FIG. 1) is moved from its viewing position to its picture-taking position in cooperation with the camera shutter releasing operation. Thus, switch 25 permits the storage of the output voltage at terminal 11 in storage capacitor 26 at the time before the aforementioned movement of mirror 78.

The base of transistor 28 is connected to one terminal of storage capacitor 26. Transistor 28 is an anti-logarithmic converting transistor, which generates a current proportional to the anti-logarithmic value of the voltage to be stored by storage capacitor 26 through its emitter and collector circuit, the aforesaid voltage being impressed across the base-emitter of transistor 28. Capacitor 30 is connected to the collector of transistor 28 and serves as an integrating capacitor which integrates the collector current. Switch 31 is in parallel with integrating capacitor 30 to discharge the capacitor. Switch 31 is normally closed but is opened before the shutter is opened in association with the camera shutter releasing operation. Switch 32 is connected to the emitter of transistor 28 as a trigger switch which is normally closed but is opened upon release of the camera shutter. The closure of switch 32 starts the charging of integrating capacitor 30 with the collector current from transistor 28.

A switching circuit consisting of differential amplifying circuit 37 has one input terminal connected to terminal 29 of integrating capacitor 30, and actuates electromagnet 40 when integrating capacitor 30 is charged to a given level, with reference to the voltage at the other terminal of the differential amplifying circuit. The actuation of electromagnet 40 releases the shutter from its locked position, in which it is closed. Resistance 35 and sliding element 36 of third potentiometer 34, which is connected in series to constant current source 33, constitutes a circuit adapted to impart a switching level to differential amplifying circuit 37 as shown in FIG. 3.

Switch 41 is closed with the initial operation of the shutter release operation to provide power from potential source 42 to the exposure control circuit. Switch 43 connected in series to power source switch 41 serves as a switch for switching the operation of the exposure control circuit from one exposure control mode to another. More particularly, the movable contact of switch 43 remains connected to contact 44 initially, for the mode where the diaphragm is automatically controlled with the shutter speed set preferentially. The movable contact of switch 43 is connected to contact 45 immediately before the release of storage switch 25 and after the diaphragm has been set according to the actuation of electromagnet 14 in association with the releasing operation of the shutter.

FIG. 1 shows the essential part of a camera exposure control mechanism using the above described exposure control circuit, in which that portion encompassed with a chain line indicates body 50 of the camera in a side view, while the right-hand portion of the Figure encompassed with a chain line shows a rear view of exchangeable lens 51. Diaphragm operating pin 54 operates diaphragm blade 53 which is located within exchangeable lens 51 and biased by spring 55 so as to be stopped-down. (Only one diaphragm blade is shown to avoid cluttering the structure shown in FIG. 1.) Operating pin 54 engages, via preview sliding plate 70, with diaphragm control lever 57 which is rotatably supported on pivot 59. Diaphragm operating pin 54 is shifted, against the tendency of spring 55 to stop-down the diaphragm by means of diaphragm control lever 57 in its cocked position, thereby maintaining diaphragm blade 53 in its open position.

The movable contact of switch 47 shown in FIG. 3 switches the shutter speed from its automatic control mode to its manual setting mode, and vice versa, by respective closure with contact 48 or contact 49, as desired by the camera operator. Switch 46 connected in parallel with switch 41 is normally open and is closed when preview button 89 is depressed against the force of spring 90 to enable the camera operator to preview the view-finder image.

OPERATION WITH PRESET SHUTTER SPEED AND AUTOMATIC CONTROL OF THE DIAPHRAGM

Figure 2:
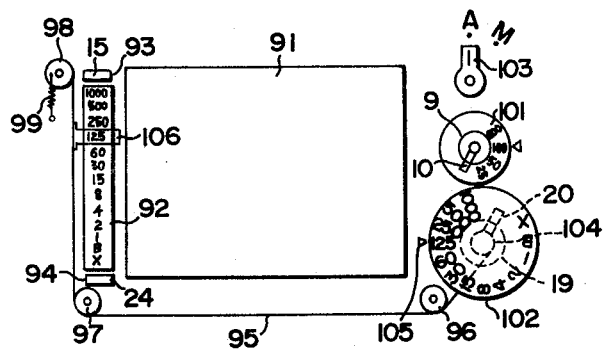
FIG. 2 is a top view of the view-finder portion of the first embodiment.

The sensitivity of the film used is determined and set by rotation of film sensitivity dial 101 (FIG. 2), which determines the position of sliding element 10 on resistance 9 of first potentiometer 8. Then, shutter speed dial 102 (shown in FIG. 2) is set to a desired shutter speed. As a result, sliding element 20 of second potentiometer 18 is positioned on resistance 19, thereby setting the switching level of differential amplifying circuit 12. In a similar manner, dial 103 is switched to position A for automatic shutter speed control. As a result, changeover switch 47 connects with contact 48 (FIG. 3). Diaphragm presetting ring 56 (FIG. 1) is manually set to a minimum aperture value of F16 relative to index 100.

With the setting as described above, when release button 60 (shown in FIG. 1) is depressed in the direction of the arrow, then power source switch 41 in the circuit of FIG. 3 is first closed, and then projection 65 of drive lever 62 is released from its cocked position, in which it has been locked by locking lever 61. Drive lever 62 is pivoted on pivot 59 and urged in a clockwise direction by spring 63, while its rotation is damped by damper 64. Since drive lever 62 is connected through spring 67 to diaphragm control lever 57, the clockwise rotation of drive lever 62 causes diaphragm control lever 57 to rotate clockwise, following contact portion 68 of drive lever 62. Simultaneously therewith, preview sliding plate 70 also moves to the right, since it is connected through spring 71 to diaphragm control lever 57. Additionally, diaphragm operating pin 54 is moved to the right by spring 55, following preview sliding plate 70 so as to stop-down diaphragm blade 53 from its open position to its stoppeddown position. At the same time, sector gear 58, formed on diaphragm control lever 57, rotates ratchet wheel 72 meshing therewith.

During the aforesaid stopping-down operation, light which has passed through objective lens 1 and diaphragm aperture formed by diaphragm blades 53 is incident on photodiode 2 shown in FIG. 3. As a result, when the diaphragm is set to an optimum diaphragm aperture, the light measuring circuit interrupts the excitation of electromagnet 14 by the output of differential amplifying circuit 12.

As shown in FIG. 1, locking lever 75 has mounted at its one end armature 74 to be drawn to electromagnet 14; and at the other end is mounted locking pawl 75. When electromagnet 14 is deenergized, locking lever 73 is rotated clockwise by spring 76, thereby bringing locking pawl 75 into engagement with ratchet wheel 72 to stop the rotation thereof. As a result, the clockwise rotation of diaphragm control lever 57 is stopped, and the movement of diaphragm operating pin 54 is also stopped, so that diaphragm blade 53 is controlled for the optimum diaphragm aperture.

In the foregoing manner, even after the clockwise rotation of diaphragm control lever 57 is stopped, drive lever 62 continues rotating, so that its projection 65 causes mirror locking lever 77 of movable mirror 78 to rotate in the counterclockwise direction against the force of spring 79. Change-over switch 43, having a movable contact in engagement with mirror locking lever 77, is switched from contact 44 to contact 45, so that the current to second potentiometer 18 and differential amplifying circuit 12 is interrupted. Simultaneously therewith, current is provided to the exposure time control portion of the circuit; storage switch 25 is opened, so that the light measuring output commensurate with the intensity of light from an object, which light has passed through the diaphragm aperture controlled in the foregoing manner, is stored in storage capacitor 26; and movable mirror 78 is released from its locked viewing position by means of mirror locking lever 77, so that movable mirror 78 is rotated to its picture-taking position by spring 80 to engage forward-curtain locking lever 81 at the terminating point of its aforesaid rotation. As a result, forward curtain spool 82, which has been cocked by lever 81, is released from its locked condition, permitting the movement of the forward curtain.

In association with the aforesaid movement of the forward curtain, trigger switch 32 (shown in FIG. 3) is closed, so that current flows through transistor 29, so that current flows through transistor 28, the current being commensurate with the intensity of light from an object, which is passed through the diaphragm aperture that has been controlled according to the voltage stored in storage capacitor 26, whereupon integrating capacitor 30 is charged with the aforesaid current as discharging switch 31 is open at that time. When the voltage of capacitor 30 reaches a given level, then the output of differential amplifying circuit 37 interrupts the excitation of electromagnet 40, thereby operating a rear curtain locking lever of a known type (not shown) to release rear curtain spool 84 from its cocked position, in which it had been locked by the rear curtain locking lever. This operation then permits movement of the rear curtain so as to complete the exposure, while the shutter speed is controlled according to the stopping-down light measurement of the brightness of light from an object stored in storage capacitor 26, after the setting of the diaphragm.

Pin 85 of rear curtain spool 84 engages return locking lever 83 at the termination of the movement of the rear curtain, thereby rotating lever 83 in the counterclockwise direction to release return lever 86 from its locked and cocked position. Thus, return lever 86 rotates clockwise under the strong force of return spring 87 so as to engage projection 66 of drive lever 62 which has been rotated clockwise at that time. This causes drive lever 62 to rotate counterclockwise against the action of drive spring 63 to thereby engage locking lever 61 to again lock it in its cocked position. Thereby, contacting portion 68 of drive lever 62 rotates diaphragm control lever 57 counterclockwise to thereby cock it in its open position, while projection 69 engages eleastic piece 88 of diaphragm locking lever 73 to rotate it counterclockwise. As a result, armature 74 is again moved against electromagnet 14.

Further, movable mirror 78 is rotated against the force of spring 80 from its picture-taking position to its viewing position in association with the clockwise rotation of return lever 86 by a known mechanism not shown, thereby engaging mirror locking lever 77 to be eventually locked in position.

When the forward curtain and rear curtain of the shutter are respectively wound around forward curtain shaft 82 and rear curtain shaft 84 by the camera cocking operation, to be locked by forward and rear curtain locking levers 81, 83, respectively, return lever 86 is rotated counterclockwise against the force of return spring 87 to be locked by locking lever 83, thus returning to the position as shown in FIG. 1. Upon the aforesaid returning operation, storage switch 25 and discharging switch 31 in the control circuit shown in FIG. 3 are again closed, while trigger switch 32 is opened and change-over switch 43 is again switched to contact 44.

The foregoing operation refers to the exposure conditions (a) described above where an optimum diaphragm aperture commensurate with the brightness of an object is controlled and determined in its possible range for a preset shutter speed. However, if an object is too dark, diaphragm locking lever 76 is operated so that the diaphragm may be locked in its fully open position, while the shutter speed is controlled within a shutter speed range slower than the preset shutter speed, depending on the intensity of light from the object, which light has passed through the fully opened diaphragm aperture. Moreover, if an object is too bright, diaphragm locking lever 76 is not operated, even if the diaphragm is stopped-down to a minimum diaphragm aperture F16, while the shutter speed is controlled within a shutter speed range faster than the preset shutter speed depending on the intensity of light from the object, which light has passed through the minimum diaphragm aperture.

SHUTTER SPEED CONTROL WITH PREFERENTIALLY SET DIAPHRAGM

In this mode of operation, herein referred to as preferentially set diaphragm control, a graduation in diaphragm presetting ring 56 is aligned with index 100, while a given shutter speed is selected by shutter speed dial 102. When preview button 89 is depressed against the force of spring 90, sliding plate 70 is moved to the right (FIG. 1). As a result, diaphragm operating pin 54 follows sliding plate 70 under the force of spring 55 to stop-down the diaphragm to a diaphragm aperture which has been set by presetting ring 56. At the same time, switch 46, arranged in parallel with power source switch 41, is closed such that there appears at terminal 11 an optimum shutter speed control voltage commensurate with the intensity of light from an object, which light has passed through the diaphragm that has been stopped-down to the aforesaid preset diaphragm aperture. Then, the aforesaid voltage is compared, by differential amplifying circuit 12, with the voltage determined by sliding element 20 of potentiometer 18 in response to the preset shutter speed. Thus, in case the former voltage is higher than the latter voltage, green light is emitted from LED 15.

If shutter release operation is made by depressing release button 60 after preview botton 89 is freed to return to the position shown in FIG. 1, the diaphragm is stopped down to the preset aperture value preselected by presetting ring 56 so that the shutter speed is controlled at a faster shutter speed commensurate with the aperture value thus set then the preselected shutter speed. As a result, assuming that the camera operator has selected the slowest shutter speed which does not cause a blurred photograph with the camera held by hands, occurrence of no blur will be indicated to the camera operator by the green light emitted from LED 15.

In contradistinction thereto, in case the voltage at terminal 11 is lower than the voltage determined by sliding element 20, green LED 15 is not lit, while red LED 24 is lit to generate a red light indication. The energization of LED 24 indicates to the camera operator that the diaphragm is to be controlled so that the resulting aperture value will be set to a value lower than that which has been set by presetting ring 56. In this respect, if an optimum exposure may be achieved according to the selected shutter speed, then an optimum exposure will be effected at the selected shutter speed. However, if an optimum exposure cannot be achieved at the preselected shutter speed even with the fully open position of the diaphragm, the shutter speed is controlled at a shutter speed slower than than the selected shutter speed to effect an optimum exposure.

If red LED 24 is lit in the above-described manner, the preset aperture value will not be set preferentially. If the preset aperture value is still desired to be set even in such a case, release button 60 may be depressed, while depressing preview button 89, for effecting such an exposure.

EXPOSURE CONTROL WITH MANUAL SHUTTER SPEED SETTING

As described above, in the preferentially set diaphragm control mode, the resulting shutter speed will not necessarily be the manually preset shutter speed. However, if the ultimate shutter speed is still desired to be the manually preset shutter speed, irrespective of an attempt to obtain an optimum exposure, then switching knob 103 is aligned with mark M (Manual). According to this operation, change-over switch 47 is switched from contact 48 to contact 49, while storage capacitor 26 stores a voltage commensurate with the selected shutter speed, the aforesaid voltage being determined by the position of sliding element 20 of potentiometer 18, irrespective of the brightness of an object. As a result, differential amplifying circuit 12 will be operated according to the stored voltage to operate electromagnet 40 to effect control of the shutter speed. Thus, the resulting shutter speed will be the manually preset shutter speed.

In contradistinction thereto, with automatic diaphragm control mode, as has been described earlier, diaphragm presetting ring 56 is set to a minimum aperture, and the shutter speed is manually set to a preselected desired shutter speed by means of shutter speed dial 102. Thereby sliding element 20 is positioned to a certain point on resistance 19, according to the manual setting of the shutter speed, so that a voltage commensurate to the preset shutter speed is provided as a reference switching level input to differential amplifying circuit 12. Thus, if for instance, the setting of the shutter speed is changed from 1/60 second to 1/125 second, then the voltage level at sliding element 20 is changed by a given voltage. In this respect, before the releasing operation of the shutter, change-over switch 43 remains connected to contact 44.

As has been described earlier with reference to the exposure conditions (a) and (b), when the voltage level at terminal 11 is higher than the voltage level at sliding element 20, green LED 15 is lit and electromagnet 14 remains excited. Thus, if release button 60 is depressed, then the stopping-down operation for the diaphragm is commenced, while the voltage level at terminal 11 is gradually lowered as the diaphragm is being stopped-down. Then, for exposure conditions (a) (optimum exposure obtainable for the brightness of an object at the selected shutter speed), when the voltage level at terminal 11 becomes equal to that at sliding element 20, differential amplifying circuit 12 is switched, so that electromagnet 14 is de-energized and the diaphragm is locked by locking lever 73, thereby setting the diaphragm.

However, for exposure conditions (b) (object too bright), even if the diaphragm is stopped-down to a minimum diaphragm aperture, the voltage level at terminal 11 is still higher than the voltage level at sliding element 20, such that electromagnet 14 continues to be energized even when the diaphragm is brought to its minimum diaphragm aperture. But, when change-over switch 43 is changed from contact 44 to contact 45 as the releasing operation of the shutter proceeds, the excitation of electromagnet 14 is interrupted. Then, the shutter speed is controlled commensurate with the intensity of light from the object, which light has passed through the diaphragm that has been stopped-down to a minimum diaphragm aperture thus determined.

As has been described earlier with reference to the exposure conditions (c) (object too dark), if the voltage level at sliding element 20 is higher than that at terminal 11 in the fully open position of the diaphragm, prior to commencement of the releasing operation of the shutter, electromagnet 14 remains deenergized from the beginning. As a result, transistor 23 remains conducting, and red LED 24 is lit, indicating that the shutter speed is set outside of the possible or controllable range of the diaphragm, and that the shutter speed to be controlled upon exposure will be slower than the manually preset shutter speed.

The exposure controlled camera according to the present invention as has been described thus far, provides an indication to the camera operator of the exposure condition in which a picture is to be taken.

INDICATING DEVICES

FIGS. 2 to 5 show one embodiment of an exposure indicating apparatus within a camera view-finder in accordance with the invention. Shutter-speed-graduated plate 92 is placed in a view-finder having shutter speed graduations positioned alongside of focussing glass 91. Shutter speed graduations are also positioned in shutter dial 102 whereby the shutter speed may be selectively set by bringing a desired graduation thereon in alignment with index 105 positioned on the camera body. String 95 is wound around shaft 104 of shutter dial 102 and runs over pulleys 96, 97, 98 to be parallel with shutter-speed-graduated plate 92, and then into pulley 98 which is biased by spring 99. Thus, when shutter speed dial 102 is stationary, string 95 is maintained in tension by spring 99. Shutter-speed-indexing member 106 is mounted to string 92 to be superposed on shutter-speed-graduated plate 92.

Indexing member 106 indexes the shutter speed on the shutter-speed-graduated plate 92 to the same shutter speed indexed by index 105 on shutter speed dial 102 in accordance with the rotation of the latter dial. Indicating windows 93, 94 are, respectively, positioned above and below shutter speed graduated plate 102 while green LED 15 and red LED 24 face indicating windows 93, 94, respectively.

With the preferentially set diaphragm control as described above, if the preselected shutter speed is set to 1/125 second as shown in FIG. 5A, the lighting of green LED 15 indicates that the aforesaid preselected shutter speed (1/125 second) is preferentially set, while the diaphragm is automatically controlled, or that the diaphragm is stopped-down to its minimum aperture value, and the shutter speed is automatically controlled for a shutter speed faster than 1/125 second. Similarly, if red LED 24 is lit as shown in FIG. 5B, diode 24 indicates that an object is too dark and out of controllable range of the diaphragm, the diaphragm is maintained in its fully open position and the shutter speed is controlled for a shutter speed slower than 1/125 second.

In the case of preferentially set diaphragm control, if the diaphragm is set by diaphragm presetting ring 56, after which a shutter speed of 1/125 second is selected as a reference, and green LED 15 is lit as shown in FIG. 5A, it indicates that the shutter speed is automatically controlled within a shutter speed range faster than 1/125 second at the preset aperture value. If red LED 24 is lit, it indicates that the diaphragm is automatically controlled for an aperture value lower than the preset aperture value at a shutter speed of 1/125 second, or that the shutter speed is automatically controlled within a shutter speed range slower than 1/125 second at a fully open position of the diaphragm. In other words, the lighting of red LED 24 indicates that the diaphragm is not preferentially set.

In this case, however, if the diaphragm is still desired to be preferentially set upon taking a picture, the shutter may be released, by depressing preview button 89. If red LED 24 is lit in such a case, it indicates that the preset aperture value is preferentially taken, and the shutter speed is automatically controlled within a shutter speed range slower than the selected shutter speed of 1/125 second.

The aforesaid description referred to the case where the selected shutter speed is 1/125 second. Thus, if a shutter speed of 1/60 second is selected, which would not cause a blurred photograph with the camera held by hands then there is no possibility of the occurrence of a blurred photograph if green LED 15 is lit. In such a case, the operator may be notified beforehand that the shutter speed is to be controlled within a shutter speed range faster than the critical shutter speed which would cause a blurred photograph, so that he may concentrate his attention on the image to be taken.

Figure 4:
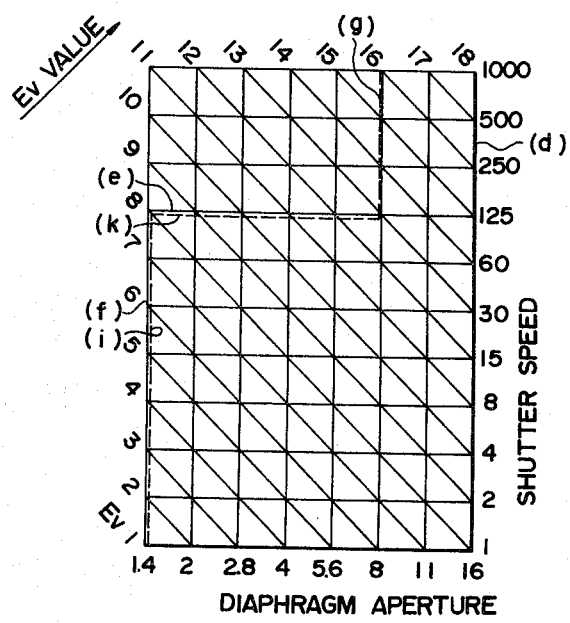
FIG. 4 is a diagram illustrating programmable exposures to be controlled.
Figure 5:
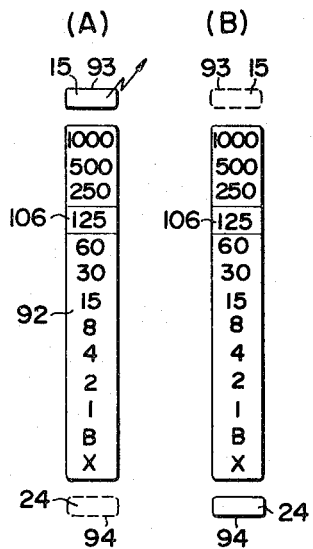
FIGS. 5A and 5B are top views respectively showing different operating examples of a first embodiment of the exposure indicating device within a view-finder for the first camera mechanism embodiment.

Lines (d), (e), (f) in FIG. 4 show a programmed exposure control diagram in the case of automatic diaphragm controlled photographing at the preset shutter speed of 1/125 second, with the preset diaphragm aperture brought to a minimum aperture value. Line (d) represents the above described exposure conditions (b), where green LED 15 is lit. Line (e) represents the above described exposure conditions (a) where green LED 15 is lit initially. Line (f) represents the above described exposure conditions (c) where red LED 24 is lit. Broken lines (g), (h), (i) in FIG. 4 show a programmed exposure diagram for automatic shutter speed control at the selected shutter speed of 1/125 second, and at an aperture value of F8. The broken line (g) represents the case where the aperture value of F8 is preferentially selected, and the shutter speed is automatically controlled within a shutter speed range faster than 1/125 second and green LED 15 is lit. Broken line (h) represents the exposure control condition where the preselected shutter speed of 1/125 second is preferentially selected and the diaphragm is automatically controlled within an aperture value range lower than F8 and red LED 24 is lit. Finally, broken line (i) represents the case where the diaphragm is maintained at its fully open position, the shutter speed is automatically controlled within a shutter speed range slower than the selected shutter speed of 1/125 second, and red LED 24 is lit.

Figure 6:
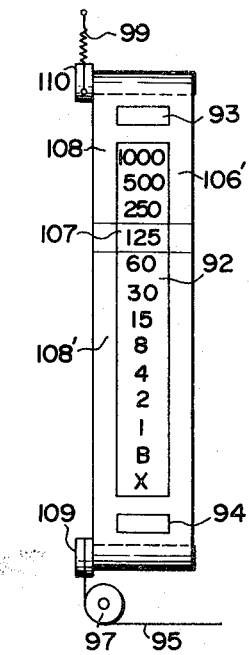
FIG. 6 is a partial top view of a second embodiment of the exposure indicating device of the invention.

Similar to the preceding embodiment, the embodiment of a shutter-speed-indicating member shown in FIG. 6 includes string 95 wound around the shaft of the shutterspeed dial. String 95 is deflected over a pulley 95 and tied to roll 109. The ends of strip member 106' are tied to rolls 109, 110 and consist of, from top to bottom, green transparent portion 108, dark green transparent portion, i.e., an indexing portion 107, and red transparent portion 108'. Roll 110 is pulled upward by spring 99, and strip member 106' is superposed on shutter-speed-graduated plate 92, as in the first embodiment of FIG. 2. Positioned above and below shutter-speed-graduated plate 92 are indicating windows 93, 94 for green and red LEDs 15, 24, respectively.

The shutter speed is indexed in a manner similar to that of the first embodiment shown in FIGS. 5A, 5B. For instance, when indexing portion 107 is aligned with the graduation of 1/125 second, the graduations of shutter speed faster than 1/125 second, i.e., 1/250 to 1/1000 second, appear green through the portion 108, while the shutter speed graduations slower than 1/125 second, i.e., 1/60 second to 1 minute, bulb (B), and X (flash) appear red through red transparent portion 108'. Accordingly, when green LED 15 is lit as shown in FIG. 5A, diode 15 indicates that the shutter speed is controlled at a shutter speed faster than 1/125 second, i.e., at a shutter speed included in green indicating portions 107, 108. However, when red LED 24 is lit, it indicates that the shutter speed is controlled at a shutter speed slower than 1/60 second as indicated through red transparent portion 109. Thus, the exposure is indicated by using numerical values and color.

Figure 7:
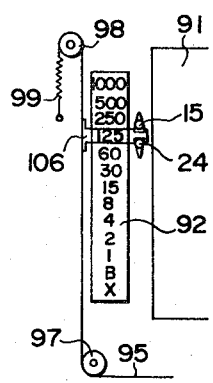
FIG. 7 is a partial top view of the third embodiment of the exposure indicating device.
Figure 8:
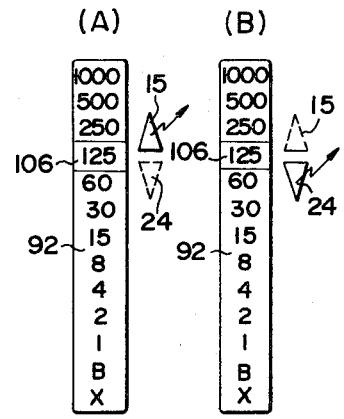
FIGS 8(A) and 8(B) show respective examples of different operating conditions for an exposure indicating device according to a third embodiment thereof.

In the first embodiment of the indicating device described above, indicating windows 93, 94 face green and red LEDs 15, 24. In contrast thereto, according to the third indicating device embodiment shown in FIG. 7, green and red LEDs 15, 24 are positioned on shutter speed indexing member 106. Accordingly, LEDs 15, 24 are movable up and down along with the indexing portion 106 while lighting. FIGS. 8A, 8B illustrate the condition of the lighting LEDs within a viewfinder.

Figure 9:
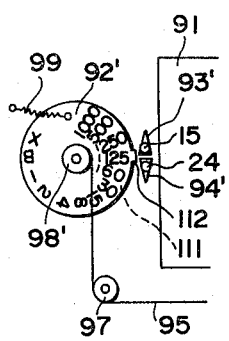
FIG. 9 is a front view of the fourth embodiment of an exposure indicating device.

FIG. 9 shows the fourth embodiment of the indicating device, in which shutter-speed-graduated disc 92' is supported on the shaft of pulley 98' positioned aside of focussing plate or glass 91, and is biased by spring 99' to rotate counterclockwise. One end of string 95 is wound around pulley 98' and maintained in tension by disc 92'. Two indicating windows 93', 94' are vertically positioned between the focussing plate or glass 91 and shutter speed graduated disc 92' such that green and red LEDs 15, 24 appear through windows 93', 94', respectively. Window 111 is formed in shutter-speed-graduated disc 92' to show three shutter speeds therein, and indexing portion 112 is provided at the center of window 111, in the form of a notch.

Figure 10:
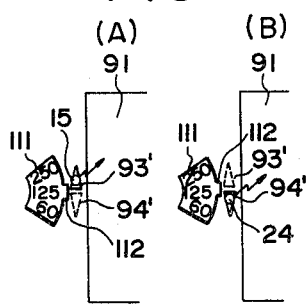
FIGS. 10(A) and 10(B) illustrate two different indicating exposure modes.

The indications of shutter speeds for exposure control are shown in FIGS. 10(A), 10(B) indicating the lighting of green LED 15 and red LED 24, respectively.

Alternatively, light-emitting diodes 15, 24 may be replaced by light-emitting lamps. However, in any case, two luminant color-indicating elements should be provided.

Figure 11:
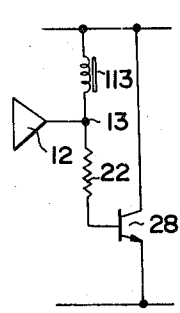
FIG. 11 is a circuit diagram of a control circuit for the fifth embodiment of the exposure mode indicating device shown in FIG. 12.
Figure 12:
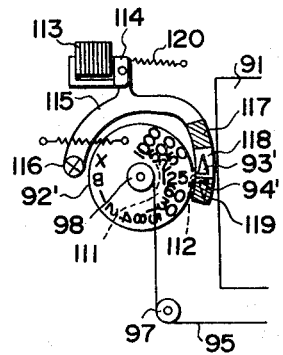
FIG. 12 is a partial top view of the fifth embodiment of the exposure indicating device.

FIGS. 11 and 12 show the fifth indicating device embodiment, in which the lighting of LEDs or lamps is not adopted. As shown in FIG. 11, indicating electromagnet 113 is connected to output 13 of differential amplifier 12 (shown in the circuit of FIG. 3). Referring to FIG. 12, indicating lever 115 having armature 114 facing electromagnet 113 is supported on pivot 116. The arrangement of shutter-speed-graduated disc 92', window 111, indicating windows 93', 94' is entirely the same as that of the fourth embodiment described above. That portion of indicating lever 115 extending over indicating windows 93', 94' has transparent portion 118, an opaque portion 119 and another opaque portion 117. Transparent portion 118 is designed to face indicating window 93', while opague portion 119 covers indicating window 94', when armature 114 is drawn to electromagnet 113. Additionally, when armature 114 is released from electromagnet 113, transparent portion 118 faces indicating window 94', while opaque portion 117 shields indicating window 93'. Therefore, indicating lever 115 keeps either one of indicating windows 93', 94' visible depending on the excited or non-excited condition of electromagnet 113. In this case, windows 93', 94' may be only colored, instead of placing LEDs in confronting relationship to indicating windows 93', 94'.

The foregoing first through fifth embodiments of the indicating devices differ in the operation of the light measuring system in accordance with the exposure control mode. In other words, in the case of preferential diaphragm setting control, the diaphragm is stopped-down to an aperture value which has been preferentially set, and the indication of light measurement is effected in accordance with the stopped-down diaphragm aperture. However, in the case of preferential shutter speed setting control, the diaphragm is kept in its fully open position and the indication of light measurement is effected according to the light measurement with the diaphragm kept in its fully open position. For this reason, in the latter case where the shutter speed is automatically controlled, preview button 89 is depressed so that the light measurement may be indicated when the diaphragm has been stopped-down to the preset aperture value.

Figure 13:
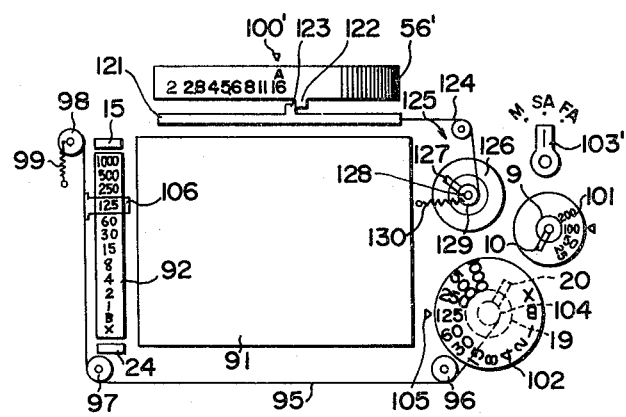
FIG. 13 is a top view of the sixth embodiment of the exposure indicating device.
Figure 14:
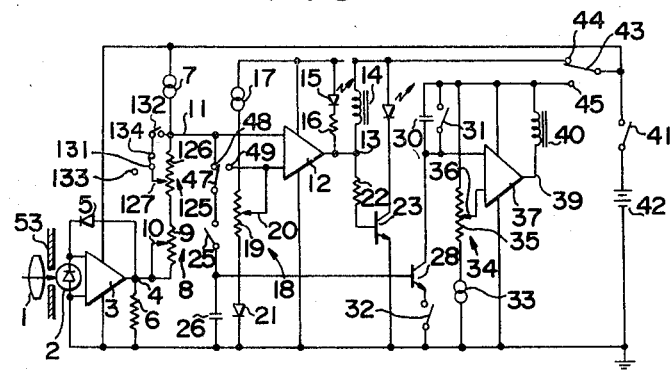
FIG. 14 is a circuit diagram of an exposure control circuit incorporating the sixth embodiment of the exposure indicating device.

In contrast thereto, FIGS. 13 and 14 show the sixth embodiment of a multi-exposure indicating device and exposure control circuit for a camera which effects light measurement with the diaphragm kept in its fully open position for automatically controlling the shutter speed, similar to the operation for automatically controlling the diaphragm.

As shown in FIG. 14, a series circuit consisting of a constant current source 7, and resistances 9 and 126 respectively of potentiometers 8, 125 provides a level shifting circuit in which the voltage appearing at terminal 11 (which voltage is the sum of the voltage across resistance 126 between sliding element 127 and the terminal of potentiometer 125 connected to terminal 11, the voltage across resistance 9 between sliding element 10 and the terminal of potentiometer 8 connected with potentiometer 125, and the voltage across output resistor 6) is a shutter speed control signal voltage.

Both resistances 9, 126 have a linear resistance characteristic, and sliding element 10 of potentiometer 8 is positioned on resistance 9 commensurate with the film sensitivity setting ($S_\gamma$), as in the first embodiment described above. Also, sliding element 127 is positioned on resistor 126 commensurate with the number of steps of the diaphragm which has been stopped-down from its fully open position to a preset aperture value. Sliding element 127 is adapted to be rotated by ring 121 which cooperates with the movement of diaphragm presetting ring 56', as shown in FIG. 13.

More particularly, as shown in FIG. 13, ring 121 having projection 123, adapted to engage projecton 122 of diaphragm presetting ring 56', is tied to string 124 wound around pulley 129 which is biased to rotate clockwise under the force of spring 130. Pulley 130 is rotatably supported on pivot 128. Sliding element 127 is integral with pulley 129 and rotates therewith in sliding relatin to resistance 126 surrounding pivot 128. Interposed between sliding element 127 and terminal 11 are serially connected switches 131 and 132.

Change-over lever 103' arranged to be switchable between shutter speed manual setting mode M, diaphragm automatic control mode FA and shutter speed automatic control mode SA. Only for the shutter speed manual setting mode M does lever 103' bring switch 47 into contact with contact 49. In the other two exposure control modes, switch 47 is brought into contact with contact 48. When change-over lever 103' is set to shutter speed automatic control SA, then switch 131 contacts contact 134.

For the diaphragm automatic setting mode, sliding element 127 should be in a position corresponding to a fully open diaphragm, thereby enabling light measurement with the diaphragm fully open and with diaphragm presetting ring 56' set to a minimum aperture value. Although diaphragm presetting ring 56' remains at a minimum aperture value, change-over lever 103' is set to diaphragm automatic control mode FA and thus switch 131 is brought into contact with contact 133, so that the same information as that obtained when diaphragm presetting ring 56' is set to its diaphragm fully open position is fed to terminal 11 through resistor 126, in place of the information at sliding element 127.

Either in the diaphragm automatic control mode or in the shutter speed automatic control mode, switch 132 interrupts the transmission of the diaphragm information governed by the position of diaphragm presetting ring 56', for effecting automatic control according to the instantaneous stopping-down light measurement, before diaphragm 53 starts its stopping-down motion from its fully open position. Accordingly, switch 132 is opened during the shutter releasing operation by release button 60 (FIG. 1), or opened upon movement of diaphragm control lever 57.

With the shutter speed automatically controlled, the diaphragm preferentially set, and preview button 89 shown in FIG. 1 depressed (the preview button is adapted to be used for viewing the depth of field) to stop-down the diaphragm, prior to taking a picture, it is necessary to interrupt the transmission of the diaphragm information which has been preset by the diaphragm presetting ring 56'. To that end, switch 47, which is adapted to be opened by preview button 89 shown in FIG. 1, is connected between sliding element 127 and terminal 11 shown in FIG. 14. Alternatively, switch 132 modified to be opened also upon the depressing of preview button 89 is used for the aforesaid purposes in common therewith, thereby indicating the light measurement according to a stopping-down light measurement upon previewing.

The circuitry in FIG. 14 other than that which has been discussed is the same as that shown in FIG. 3, and has been identified by the same numeral designations.

With respect to FIG. 13, and in accordance with the structure and operation of the exposure control circuit shown in FIG. 14, the shutter speed is automatically controlled as follows. Ring 121 follows the movement of diaphragm-presetting ring 56' to bring its aperture value graduation into alignment with index 100', while sliding element 127 on pulley 129 slides on resistor 126 to thereby set the resistance of potentiometer 125. Thus, depending on whether the resulting shutter speed is controlled within a shutter speed range faster or slower than the preselected shutter speed, green LED 15 or red LED 24 is lit, thus indicating the automatically controllable range of the shutter speed.

For the shutter speed control with preferentially set diaphragm exposure mode, diaphragm presetting ring 56' is set to a minimum aperture value to allow the diaphragm to assume the desired aperture value, and then change-over lever 103' is set to the graduation FA to open switch 131.

As is clear from the foregoing description, according to the sixth embodiment of the invention, the selection of the shutter speed automatic control mode and the diaphragm automatic control mode can be effected by using only the switching funcion of change-over switch 103'. In addition, in both modes, indication is made with the diaphragm held at its fully open position to inform an operator of how the eventual shutter speed and diaphragm aperture will be.

Figure 15:
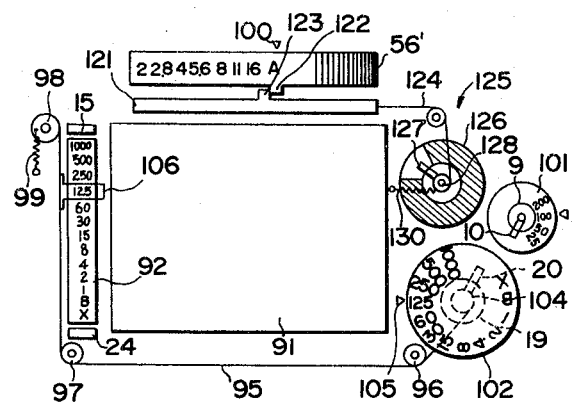
FIG. 15 is a top view of a seventh embodiment of the exposure indicating device.
Figure 16:
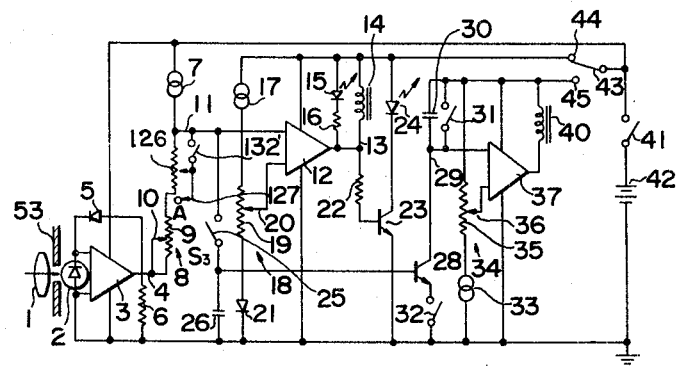
FIG. 16 is a circuit diagram of an exposure control circuit incorporating the seventh embodiment of the exposure indicating device.

The seventh embodiment of the indicating device and exposure control circuit is shown in FIGS. 15 and 16. Automatic exposure control is effected according to the instantaneous stopping-down light measurement operation described above either for automatic control of the diaphragm or for automatic control of the shutter speed.

In FIG. 16, a series circuit consists of constant current source 7, and resistances 9, 126 of respective potentiometers 8, 125, and is a level shifting circuit as in the sixth embodiment, so that the voltage appearing at terminal 11 is a shutter speed control signal voltage. Both resistances 9 and 126 have linear resistance characteristic. As in the sixth embodiment, sliding element 10 is positioned on resistance 9 commensurate with the setting of film sensitivity setting dial 101 (FIG. 15). Sliding element 127 is positioned on resistance 126 commensurate with the preset aperture value by diaphragm presetting ring 56'. However, diaphragm automatic control graduation A is provided on diaphragm presetting ring 56' separately from minimum aperture value F16, as shown in FIG. 15. Thus, when the diaphragm automatic control graduation is set to index 100 as shown in FIG. 15, then sliding element 127 no longer contacts resistance 126 but is connected to terminal A, as shown in FIG. 16.

Interposed between sliding element 127 and terminal 11 is switch 132' which interrupts the transmission of information corresponding to the aperture value which has been set by diaphragm presetting ring 56', before diaphragm 53 starts to be stopped-down from its fully open position for effecting automatic exposure control according to the instantaneous stopping-down light measurement operation previously described. The aforesaid interruption by switch 132' is effected not only for automatic diaphragm control but also for automatic shutter speed control. For this reason, switch 132' is designed to be opened at the end of the depressing motion of the release button, or when the diaphragm control lever starts to move.

However, for a single reflex camera, in which the diaphragm is preferentially set and the shutter speed is automatically controlled, switch 132' may be closed at all times, so that the diaphragm information is fed into a storage circuit, and storage switch 25 may be opened prior to the commencement of the stopping-down operation. In this case, information for automatically controlling the shutter speed may be stored in storage capacitor 26, with the diaphragm maintained in its fully open position. The shutter speed may be automatically controlled commensurate with the stored value in storage capacitor 26.

As in the sixth embodiment a switch, which is adapted to interrupt the transmission of the diaphragm information that has been set by diaphragm presetting ring 56' upon previewing, is connected in series to switch 132', or otherwise switch 132' modified to be also opened upon previewing is used for the aforesaid purpose in common with the aforementioned switch.

The remaining circuitry shown in FIG. 16 is the same as that of the circuitry for the sixth embodiment of FIG. 14 and has been given the same numerical designations.

A feature of the seventh embodiment is that for operation with preset shutter speed and automatic diaphragm control, the aligning of graduation A of diaphragm presetting ring 56' with index 100 interrupts the contact of sliding element 127 with resistance 126, so that the voltage across output resistor 6, to which has been added the voltage of potentiometers 8, 25, appears at terminal 11 as a shutter speed control signal voltage, thereby indicating the various conditions of exposure to be effected.

FIGS. 17 to 20 are directed to the eighth embodiment of the invention, the circuit arrangement of which is different from those shown in the first seven embodiments to a great extent, but the principle of operation of which is common to those embodiments.

Figure 18:
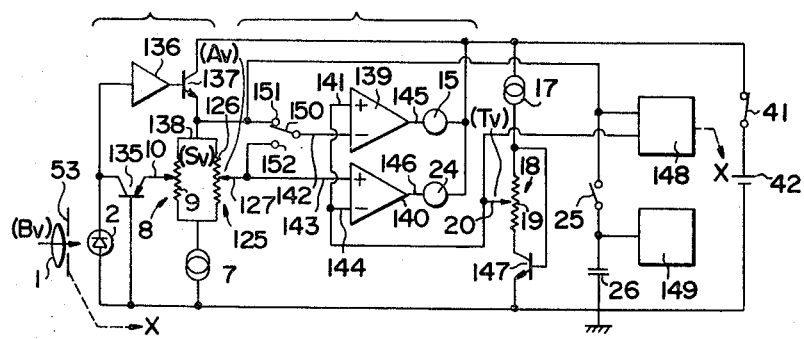
FIG. 18 is a circuit diagram of an exposure control circuit using the eighth embodiment of the exposure indicating device.

With respect to FIG. 18, a photoelectric current produced by photodiode 2 in accordance with incident light ($B_V$), which has passed through objective lens 1 and the fully open diaphragm aperture formed by diaphragm blades 53, generates a voltage, proportional to ($B_V - A_{Vo}$), which has been logarithmically converted by NPN transistor 135, across the base-emitter of transistor 135, wherein $A_{Vo}$ represents the lowest aperture value. Potentiometers 8 and 125 are respectively set in accordance with the film sensitivity $S_V$ and the preset aperture value $A_V$, and resistances 9 and 126 of the respective potentiometers are connected to a constant current circuit 7 in parallel with each other. Amplifying circuit 136 and transistor 137 form a high input impedance amplifying circuit, the input of which is negatively fed back by a negative feedback circuit consisting of transistor 137, sliding element 10 of potentiometer 8, and the emitter of transistor 135, thereby maintaining a constant voltage (almost zero volts) across photodiode 2 during light measurement.

For the purposes of the ensuing description, the following signal definitions are made. A first voltage signal is proportional to the logarithmic value of the intensity of light from an object, which light has passed through objective lens 1 and the diaphragm aperture formed by diaphragm blades 53, and the first voltage appears across the emitter-base of 135 in the light measuring portion of the aforesaid arrangement. A second voltage signal is the sum of the aforesaid first voltage signal and a voltage commensurate with the film sensitivity and appears between sliding element 10 and terminal 138, i.e., a voltage across terminal 138 and ground. Additionally, a third voltage signal is a balance between the second voltage signal and that voltage which appears between terminal 138 and sliding element 127 and corresponds to the preset aperture value.

Voltage comparing circuits 138, 140 consist of respective differential amplifying circuits. Thus, when the potentials at the respective voltage comparing circuit negative input terminals 142, 144 are lower than the potentials at the respective input terminals 141, 143, the respective output potentials at terminals 145, 146 remain at the same level as that of the position terminal of potential source 42, so that LEDs 15, 24 are not lit. Contrary to the above case, when the potentials at the respective voltage comparing circuit negative input terminals 142, 144 are higher than the potentials at the respective input terminals 141, 143, the respective output potentials at output terminals 145, 146 are at the same level as that of the negative terminal of power source 42, so that LEDs 15, 24 are lit.

A circuit consisting of constant current circuit 17, potentiometer 18 and transistor 147 generates a fourth voltage signal commensurate with the set shutter speed.

Diaphragm-determining means 148 determines the diaphragm aperture by comparing the fourth voltage signal with the second voltage signal. The fourth voltage is produced at sliding element 20 of potentiometer 18. the second voltage is produced at terminal 138, and both voltage signals are input to diaphragm determining means 148. The output of diaphragm determining means 148 de-energizes electromagnet 14 (not shown in FIG. 18), as in the preceding embodiment, thereby locking the stopped-down diaphragm.

Exposure time control circuit 149 retains the second voltage signal by capacitor 26 by opening storing switch 25 prior to the rotation of the movable mirror from its viewing position to its picture-taking position in association with the release operation of the shutter as has been described above with respect to the previous embodiments. Then timing counting is effected commensurate with the voltage thus retained or stored, simultaneously with the commencement of movement of the forward shutter curtain, which is initiated by the releasing operation of the shutter, whereby movement of the rear shutter curtain is controlled to control the exposure time.

As an alternative for exposure-time control circuit 149, in which the exposure time is controlled by means of a stored voltage, i.e., the second voltage signal of storage capacitor 26, light from an object, which is being reflected on a film surface as well as on the forward curtain, may be received by a light receiving element, so that the photoelectric current produced thereby may be controlled by integrating the aforesaid photoelectric current. Thereby, storage capacitor 26 is not required.

The automatic control of the shutter and automatic control of the diaphragm is effected by change-over switch 150.

Figure 17:
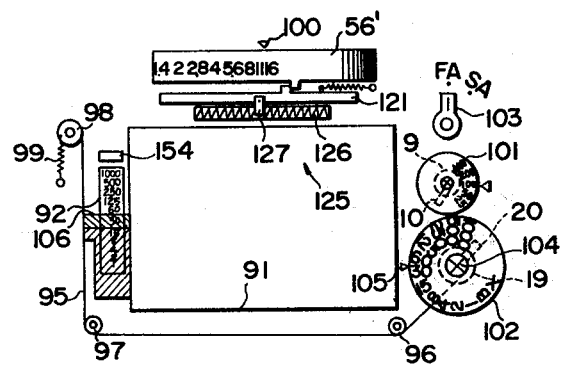
FIG. 17 is an eighth embodiment of the exposure indicating device according to the invention.

The following is a description of the operation of the circuit of FIG. 18 and the structure of FIG. 17 with the assumption that change-over switch 150 is closed on contact 151. With the shutter speed set to 1/30 second, the fourth signal voltage corresponding to 1/30 second appears at sliding element 20. Assume that a voltage exactly equal to this voltage is retained by storage capacitor 26, then exposure time control circuit 149 controls shutter speed at 1/30 second. Diaphragm 53 for objective lens (FIG. 1) is initially in its fully open position, while at this time the second voltage signal appears at terminal 138 for controlling the shutter speed for the fully opened aperture value. Meanwhile, a minimum aperture value of F16 has been preset by presetting ring 56' as shown in FIG. 17. According to the aforesaid setting operation, sliding element 127 of potentiometer 125 is positioned to lower the voltage at sliding element 127 as compared with the voltage at terminal 138 by an amount corresponding to the stopped-down stages (seven stages) from the fully open aperture value F1.4 to F16. As a result, the third voltage signal for controlling the shutter speed for the minimum aperture value of F16 is produced at sliding element 127, with diaphragm 53 being in its fully open position.

The following description is directed to the lighting condition of LEDs 15, 24, where the diaphragm is maintained in its fully open condition as described above. Assume that the film sensitivity is constant. For the case where the second voltage signal at point 138 corresponds to a shutter speed slower than 1/30 second, which has been preset i.e., a voltage lower than the voltage at sliding element 20, there is a higher output level at output terminal 145, so that green LED 15 will not be lit. This condition is represented by broken line (m) in FIG. 20. However, red LED 24 is lit, because the voltage at input terminal 144 is higher than that at input terminal 143, with the result that the voltage at output terminal 146 will be at a low level. In this case, if the releasing operation of the shutter is effected, then the diaphragm remains at its fully open position, rather than being stopped-down from its fully open position, while the shutter speed is controlled within a shutter speed range slower than the aforesaid set shutter speed, thus providing an exposure control as shown by the previously defined exposure condition (c).

Figure 19:
FIG. 19 is a longitudinal cross-sectional view of an example of an indicating lamp.

The following description represents the case where the brightness of an object is increased from the aforesaid condition. The second voltage appearing at terminal 138 becomes higher than the fourth voltage signal appearing at sliding element 20, which corresponds to the preset shutter speed of 1/30 second. The third voltage signal at sliding element 127 is not higher than the voltage signal at sliding element 20, i.e., this represents the case where the aperture value remains between EV6 and EV13 in FIG. 20. In this case, both LEDs 15, 24 are lit. As shown in FIG. 19, when both LEDs 15, 24 are enclosed within a single light shielding globe 153 (FIG. 19), then the light emitted therefrom appears yellow or orange-colored. As a result, when indicating window 154 (FIG. 17) appears yellow or orange-colored, then the shutter speed is controlled at the preset shutter speed of 1/30 second, as shown by line (j) in FIG. 20, thereby accommodating for the intensity of light from an object through the diaphragm to effect exposure control with the previously defined exposure condition (a).

When the brightness of an object is increased from the aforesaid condition, for example to over EV13 in terms of the aperture value, then the third voltage signal at sliding element 127 becomes higher than the fourth voltage signal which corresponds to a voltage signal of 1/30 second appearing at sliding element 20. Thus, green LED 15 alone is lit, while red LED 24 is off. This represents the condition shown by solid line k, in which the diaphragm is stopped-down to a minimum diaphragm aperture F16, and yet the resulting shutter speed is controlled at faster shutter speed than 1/30 second which had been previously set.

It is to be understood that while the previous description pertained to the case where the preset shutter speed was 1/30 second, for the purposes of demonstrating the operation of the eighth embodiment, other shutter speeds may be used. Also, the operation of presetting ring 56' has been described with respect to a minimum aperture value of F16. However, such description was for the purpose of illustrating the operation of the device and intermediate aperture values may also be used.

The following description pertains to the operation of the device with automatic shutter speed control and preferentially set diaphragm. In this case, diaphragm determining means 148 is rendered inoperable, while the diaphragm is stopped-down to a preset aperture value by diaphragm presetting ring 56', so that the shutter speed is controlled according to the previously described stopping-down light measurement operation. In such a case, change-over member 103 (FIG. 17) is manipulated to change switch 150 from contact 151 to contact 152 (FIG. 18).

With reference to the circuit of FIG. 18, the diaphragm is preset to an aperture value determined by diaphragm presetting ring 56', in association with the releasing operation of the shutter, irrespective of the brightness of the object. Then, the second voltage appearing at terminal 138 at the completion of the stopping-down operation is retained or stored by storage capacitor 26, whereby the shutter speed is automatically controlled according to the stored voltage. At this time, when the selected shutter speed is set to 1/30 second by shutter speed dial 102, both LEDs 15, 24 are lit, as long as the voltage level at negative input terminals 142, 144 is higher than the voltage level at positive input terminals 141, 143 in voltage comparing circuits 139, 140. Thereby, the lighting of LEDs 15, 24 indicates whether the shutter speed to be automatically controlled is faster or slower than the preselected shutter speed of 1/30 second.

Figure 20:
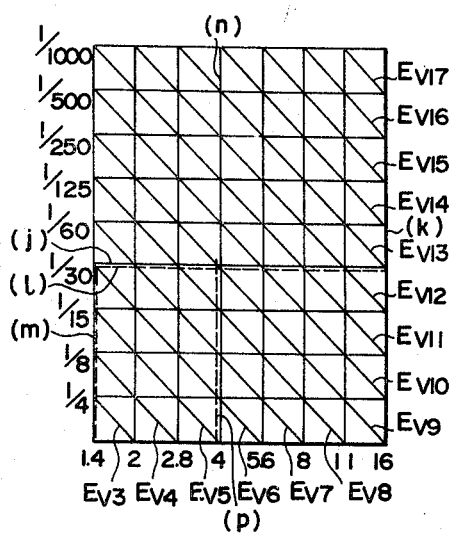
FIG. 20 is a diagram showing programmable exposures to be controlled according to the eighth embodiment of the invention.

For instance in FIG. 20, consider the case where the diaphragm aperture is set to F4, while the selected shutter speed is 1/30 second, which is a critical shutter speed upon photograph with the camera held by hands so as not to cause a blurred photograph. Both LEDs 15, 24 are lit when the aperture value approaches EV9, and when the EV value is higher than that, then green LED 15 alone is lit. But, when the EV value is lower than EV9, then red LED 24 alone is lit, indicating to the camera operator that a blurred picture may be caused with the camera held by hands.

The eighth embodiment differs from the sixth embodiment in that the position of sliding element 127 on resistance 126 is directly set by means of ring 121', the movement of which follows diaphragm presetting ring 56', and in that only single indicating window 154 is used in place of two indicating windows of the first through the fourth, and the six and seventh embodiments.

Alternatively, however in the eighth embodiment, two indicating windows may also be used; and LEDs 15 and 24 are then arranged to face the respective indicating windows.

According to the operation of the first to seventh embodiments, particularly in the case of the automatic diaphragm control mode, exposure conditions (a), (b) cannot be discriminated from each other unless preview button 89 is depressed to stop-down the diaphragm to a minimum aperture. However, in the eighth embodiment, exposure conditions (a), (b), (c) can each be indicated without depressing preview button 89.

Those skilled in the art will recognize that in the respective foregoing embodiments, the automatic diaphragm control device consisting of electromagnet 14, armature 74, diaphragm locking lever 73, ratchet wheel 72 and sector-shaped gear portion 58 may be omitted, while the diaphragm may be manually preferentially set, and the shutter speed automatically controlled.

Finally, as this invention may be embodied in modified forms without departing from the essential characteristics thereof, the described embodiments are to be considered as merely illustrative and not restrictive, and the scope of the invention is defined by the appended claims rather than by the description preceding them; and all changes and modifications that fall within the meets and bounds of the claims, or the equivalence thereof, are therefore intended to be embraced by the claims.

What is claimed is:

1. In a camera of the automatic shutter control type including: an objective lens; a diaphragm; a light measuring circuit for measuring the intensity of light passed through said objective lens and a diaphragm aperture formed by said diaphragm; a diaphragm-operating member movable between a cocked position in which said diaphragm is in its fully open position and a rest position in which said diaphragm is stopped-down; automatic stopping-down means for bringing said diaphragm-operating member from its cocked position to its rest position before commencement of an exposure in response to shutter releasing operation; means for selecting a diaphragm aperture manually; a diaphragm-aperture determining means for setting said diaphragm to a selected diaphragm aperture in association with said diaphragm selecting means against the action of said automatic stopping-down means; and a first output circuit for producing a first output obtained by computation of the intensity of said light from said light measuring circuit and the film sensitivity to be used; an exposure indicating device comprising:

means for selecting a shutter speed;
   a second output circuit for producing a second output corresponding to a selected shutter speed selected by and in association with the operation of said shutter speed selecting means;
   a third output circuit for producing a third output obtained by adding a signal representative of the diaphragm aperture selected by said diaphragm selecting means to the output of said first output circuit;
   means for comparing said second and third outputs with each other to produce an output dependent on the result of the comparison;
   first indicating means for indicating said selected shutter speed; and
   second indicating means connected to said comparison means for indicating that a shutter speed to be obtained with said diaphragm stopped-down to the selected aperture is faster than the selected shutter speed, depending on the output from said comparison means; and
   third indicating means connected to said comparison means for indicating that a shutter speed to be obtained with said diaphragm stopped-down to the selected shutter speed is slower than the selected shutter speed, depending on the output from said comparison means.

2. An exposure indicating device as in claim 1, wherein said camera further comprises means for controlling the shutter speed in accordance with said first output generated after said diaphragm aperture determining means has set said diaphragm to the selected diaphram aperture, whereby said first output includes a signal representative of the selected diaphragm aperture and a signal representative of the brightness of an object and the film sensitivity.

3. An exposure indicating device as set forth in claim 1, wherein said camera further includes means for controlling the shutter speed in accordance with said third output, said first output being generated before the stopping-down operation of said diaphragm.

4. An exposure indicating device as in claim 1, further comprising a switching circuit, wherein said comparing means includes a differential amplifying circuit responsive to said first and second outputs, and wherein said second indicating means includes a first luminary element and said third indicating means includes a second luminary element, either said first or second luminary element being directly connected to said differential amplifying circuit and the other luminary element being connected to said differential circuit through said switching circuit, whereby when either said first or second luminary element is turned on, the other luminary element is turned off.

5. In a camera including:
   an objective lens;
   a diaphragm;
   a diaphragm operating member movable between a cocked position in which said diaphragm is in its fully open position and a rest position in which said diaphragm is stopped-down;
   automatic diaphragm stopping-down means for bringing said diaphragm operating member to said rest position before commencement of an exposure in response to shutter release operation;
   a light measuring circuit for producing an output commensurate with the intensity of light passed through said objective lens and the diaphragm aperture formed by said diaphragm;
   a first output circuit for adding a signal representative of the film sensitivity to the output from said light measuring circuit to produce a first output commensurate with the intensity of said light and said film sensitivity;
   a second output circuit for producing a signal output commensurate with a preselected shutter speed;
   means for comparing said first and second outputs with each other;
   first diaphragm determining means for locking said automatic diaphragm stopping-down means during said stopping-down operation at a position dependent on the result of the comparison by said comparing means;
   means for controlling the shutter speed depending on said first output generated after the termination of said stopping-down operation;
   an exposure indicating device comprising:
   first indicating means for indicating the preselected shutter speed; and
   second indicating means connected to said comparing means for indicating that a shutter speed to be obtained with said diaphragm maintained at its fully open aperture is faster than the selected shutter speed, depending on the comparison by said comparing means and prior to the commencement of said stopping-down operation; and
   third indicating means connected to said comparing means for indicating that a shutter speed to be obtained with said diaphragm maintained at its fully open aperture is slower than the selected shutter speed, depending on the result of the comparison by said comparing means and prior to commencement of said stopping-down operation.

6. An exposure indicating device as in claim 5, wherein said camera further comprises:
   second diaphragm determining means for locking said automatic diaphragm stopping-down means during said stopping-down operation at a position in which said diaphragm is set to the preset aperture, the position of said automatic diaphragm stopping-down means being determined by said first diaphragm determining means only when the position of said automatic stopping-down means is between the position where said diaphragm is set to the preset aperture and the position where said diaphragm is set to the fully open position.

7. An exposure indicating device as in claim 6, wherein said camera further comprises:
   manual means for selecting either the automatic shutter speed control mode or the automatic diaphragm control mode;
   means for adding to said first output a signal representative of the stages said diaphragm is stopped-down from its fully open position to the preset aperture;

means for interrupting said adding means when said manual means is set to select the automatic diaphragm control mode; and means for interrupting said adding means prior to the stopping-down operation in association with the shutter release operation.

8. An exposure indicating device as in claim 6, further comprising:

a power source;

a first power switch connected between said power source and said first and second output circuits, comparing means, light measuring circuit, first diaphragm determining means, shutter speed controlling means and second indicating means, said power switch being closed before the stopping-down operation in association with the shutter release operation;

manual means for stopping-down said diaphragm to the preset aperture determined by said second diaphragm determining means, irrespective of the shutter release operation; and a second power switch connected in parallel with said first power switch and closed upon the operation of said manual means.

9. An exposure indicating device as in claim 6, further comprising:

manual means for selecting either the automatic shutter speed control mode or the manual shutter speed control mode; and a switch for feeding said first output to said shutter speed control means when said manual means selects the automatic shutter speed control mode and for feeding said second output when said manual means selects the manual shutter speed control mode.

10. An exposure indicating device as in claim 6, further comprising a switching circuit, wherein said second indicating means includes a first luminary element and said third indicating means includes a second luminary element, either said first or second luminary element being directly connected to said comparing means and the other luminary element being connected to said comparing means through said switching circuit, whereby when said first or second luminary element is turned on, the other luminary element is turned off.

11. An exposure indicating device as in claim 10, wherein said preselected shutter speed indicating means includes a disc having graduated shutter speeds thereon, means for rotating said disc in accordance with the operation of said means for selecting shutter speed, a fixed index for indicating the shutter speed graduations selected by said shutter speed selecting member, means for indicating that shutter speed at least one stage faster or slower than said selected shutter speed, and said first and second luminary elements being mounted outwardly of the periphery of said disc.

12. An exposure indicating device as in claim 10, wherein said first indicating means includes a member bearing shutter speed graduations and an indexing member movable along said graduations in accordance with the setting of the preselected shutter speed, and wherein said first and second luminary elements are mounted on said indexing member separated by a distance in the direction of the movement of said indexing member.

13. An exposure indicating device as in claim 10, wherein said first and second luminary elements respectively emit light of different color, and said first indicating means includes:

a member bearing shutter speed graduations; and an indexing member made of a transparent material and movable over said shutter speed graduations in accordance with the setting of the preselected shutter speed, said indexing member having an indexing portion and a pair of shielding portions adjacent to said indexing portion, one of said shielding portions being of the same color as that of the light from said first luminary element, and the other of said shielding portions being of the same color as that of the light from said second luminary element.

14. An exposure indicating device as set forth in claim 10, wherein said first diaphragm determining means includes an electromagnet which locks said automatic diaphragm stopping-down means upon actuation thereof, said electromagnet being connected to said comparing means to be actuated when said first and second outputs are balanced with each other during said stopping-down operation, and also connected in parallel with said first or second luminary element directly connected to said comparing means.

15. An exposure indicating device as in claim 10, further comprising a viewfinder including a focussing glass, wherein said preselected shutter speed indicating means includes a plate having graduated shutter speeds thereon and fixedly positioned along one side of said focussing glass and an index movable with respect to the graduations in accordance with the operation of said means for selecting shutter speed, and wherein said first and second luminary elements are positioned on the opposite sides of said plate and aligned with the direction of the movement of said index.

16. An exposure indicating device as in claim 10, wherein said first and second luminary elements are light emitting diodes respectively emitting light of a different color.

17. An exposure indicating device as in claim 16, wherein one of said light emitting diodes emits green light and the other emits red light.

18. In a camera including:

an objective lens;

a diaphragm;

a diaphragm operating member movable between a cocked position in which said diaphragm is in its fully open position and a rest position in which said diaphragm is stopped-down to its minimum aperture;

automatic diaphragm stopping-down means for bringing said diaphragm operating member to said rest position before commencement of an exposure in response to shutter release operation;

a light measuring circuit for producing an output commensurate with the intensity of the light passed through said objective lens and the aperture formed by said diaphragm;

a first output circuit for adding a signal representative of film sensitivity to the output from said light measuring circuit to produce a first output commensurate with the intensity of said light and the film sensitivity;

means for preselecting a shutter speed;

a second output circuit for producing a second output commensurate with a preselected shutter speed;

means for presetting the diaphragm aperture;

a first comparing circuit for comparing said first and second outputs to produce a third output dependent on the result of the comparison;

first diaphragm determining means for locking said automatic diaphragm stopping-down means during the stopping-down operation at a position dependent on said third output;

second diaphragm determining means for locking said automatic diaphragm stopping-down means during the stopping-down operation at a position in which said diaphragm is set to the preset aperture, the position of said automatic diaphragm stopping-down means being determined by said first diaphragm stopping-down means only when the position of said automatic diaphragm stopping-down means is between the position where said diaphragm is fully open and the position where said diaphragm is set to the preset aperture;

means for controlling the shutter speed depending on said first output generated after the stopping-down operation of said diaphragm, an indicating device comprising:

a third output circuit for adding to said first output a signal representative of the stages said diaphragm is stopped-down from its fully open position to the preset aperture for producing a fourth output;

a second comparing circuit for comparing said second and fourth outputs to produce a fifth output dependent on the result of the comparison before the stopping-down operation of said diaphragm;

means for indicating the preselected shutter speed;

a first luminary element responsive to said third output generated before the stopping-down operation of said diaphragm; and a second luminary element responsive to said fifth output;

whereby said first luminary element is lit when the intensity of said light is too high to obtain an optimum exposure with the preselected shutter speed and the preset diaphragm aperture, said second luminary element is lit when the intensity of said light is too low to obrain an optimum exposure with the preselected shutter speed and the fully open diaphragm aperture, and both said first and second luminary elements are lit when the intensity of said light is at a level to permit an optimum exposure with the preselected shutter speed and a diaphragm aperture extending from the fully open aperture to the preset aperture.

19. An exposure indicating device as in claim 18, wherein said first and second luminary elements emit colored light of complementary relationship to each other.

20. An exposure indicating device as in claim 19, further comprising a light diffusing cover made of transparent material and covering said first and second luminary elements, whereby the light, emitting from said cover when said first and second luminary elements turn on, is of a different color from that emitted by said first and second luminary elements.

21. In a camera including:
an objective lens;
a diaphragm;
a diaphragm operating member movable between a cocked position in which said diaphragm is in its fully open position dand a rest position in which said diaphragm is stopped-down;
automatic diaphragm stopping-down means for bringing said diaphragm operating member to said rest position before commencement of an exposure in response to shutter release operation;

a light measuring circuit for producing an output commensurate with the intensity of light passed through said objective lens and the diaphragm aperture formed by said diaphragm;

a first output circuit for adding a signal representative of the film sensitivity to the output from said light measuring circuit to produce a first output commensurate with the intensity of said light and said film sensitivity;

a second output circuit for producing a signal output commensurate with a preselected shutter speed;

means for comparing said first and second outputs with each other;

first diaphragm determining means for locking said automatic diaphragm stopping-down means during said stopping-down operation at a position dependent on the result of the comparison by said comparing means;

means for presetting the diaphragm aperture;

second diaphragm determining means for locking said automatic diaphragm stopping-down means during said stopping-down operation at a position in which said diaphragm is set to the preset aperture, the position of said automatic diaphragm stopping-down means being determined by said first diaphragm determining means only when the position of said automatic stopping-down means is between the position where said diaphragm is set to the preset aperture and the position where said diaphragm is set to the fully open aperture;

means for controlling the shutter speed depending on said first output generated after the termination of said stopping-down operation;

an exposure indicating device comprising:

a member bearing shutter speed graduations;

an indexing member for indexing one of the shutter speed graduations, said shutter speed graduation bearing member being movable relative to said indexing member in accordance with the setting of the preselected shutter speed so that said indexing member indexes the shutter speed graduation representative of the preselected shutter speed;

an electromagnet connected to said comparing means to be energized when a predetermined one of said first and second outputs is greater than the other;

a pair of indicating means one of which indicates one of the shutter speed graduations adjacent to the indexed shutter speed graduation to indicate that a shutter speed to be obtained with said diaphragm stopped-down to the preset aperture is faster than the preselected shutter speed represented by the indexed shutter speed graduation and the other of which indicates the other of the shutter speed graduations adjacent to the indexed shutter speed graduation to indicate that a shutter speed to be obtained with said diaphragm stopped-down to the preset aperture is slower than the preselected shutter speed represented by the indexed shutter speed graduation; and means for shielding one of said indicating means depending on the energization and deenergization of said electromagnet.

* * * * *